United States Patent
Ebina

(10) Patent No.: US 9,267,802 B2
(45) Date of Patent: Feb. 23, 2016

(54) NAVIGATION DEVICE AND METHOD FOR NAVIGATING

(75) Inventor: Hiroki Ebina, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/370,409

(22) PCT Filed: Feb. 1, 2012

(86) PCT No.: PCT/JP2012/052209
§ 371 (c)(1),
(2), (4) Date: Jul. 2, 2014

(87) PCT Pub. No.: WO2013/114581
PCT Pub. Date: Aug. 8, 2013

(65) Prior Publication Data
US 2014/0343853 A1    Nov. 20, 2014

(51) Int. Cl.
G01C 21/20    (2006.01)
G01C 21/34    (2006.01)
G01C 21/36    (2006.01)

(52) U.S. Cl.
CPC ............ *G01C 21/20* (2013.01); *G01C 21/3415* (2013.01); *G01C 21/3676* (2013.01)

(58) Field of Classification Search
CPC . G01C 21/20; G01C 21/3676; G01C 21/3415
USPC ....................................................... 701/541
See application file for complete search history.

(56) References Cited

U.S. PATENT DOCUMENTS

| 5,712,788 | A | * | 1/1998 | Liaw et al. ..................... 701/533 |
| 2007/0288162 | A1 | * | 12/2007 | Furukawa ...................... 701/210 |
| 2008/0125963 | A1 | | 5/2008 | Shimizu |
| 2008/0275636 | A1 | | 11/2008 | Hirose |
| 2011/0144899 | A1 | | 6/2011 | Soelberg |
| 2012/0310528 | A1 | | 12/2012 | Soelberg |
| 2013/0131987 | A1 | | 5/2013 | Soelberg |

FOREIGN PATENT DOCUMENTS

| JP | 11-295095 A | 10/1999 |
| JP | 2000-088593 A | 3/2000 |
| JP | 2000-241186 A | 9/2000 |
| JP | 2002-22469 A | 1/2002 |
| JP | 2003-294471 A | 10/2003 |

(Continued)

*Primary Examiner* — James Trammell
*Assistant Examiner* — Annie Mazzara
(74) *Attorney, Agent, or Firm* — Birch, Stewart, Kolasch & Birch, LLP

(57) ABSTRACT

An object of the present invention is to provide a navigation technology capable of enhancing convenience for a user in the cancellation of the designation of an interchange on a guide route. In order to achieve the object, a navigation device of the present invention includes: a route guide unit capable of presenting a guide route; and a re-routing unit that cancels the designation of an interchange based on detection of a predetermined condition including at least one of a first condition, a second condition and a third condition, and performs re-routing for the guide route. Then, the first condition is a predetermined number of re-routings on a general road, the second condition is entrance to the expressway from an interchange different from the designated entrance interchange, and the third condition is entrance to the general road from an interchange located before the designated exit interchange in a traveling direction.

6 Claims, 13 Drawing Sheets

(56) References Cited

FOREIGN PATENT DOCUMENTS

| | | | |
|---|---|---|---|
| JP | 2006-3199 | A | 1/2006 |
| JP | 2006-017669 | A | 1/2006 |
| JP | 2007-114008 | A | 5/2007 |
| JP | 2008-014753 | A | 1/2008 |
| JP | 2005/093373 | A1 | 2/2008 |
| JP | 2008-134086 | A | 6/2008 |
| JP | 2009-36565 | A | 2/2009 |

* cited by examiner

FIG. 6
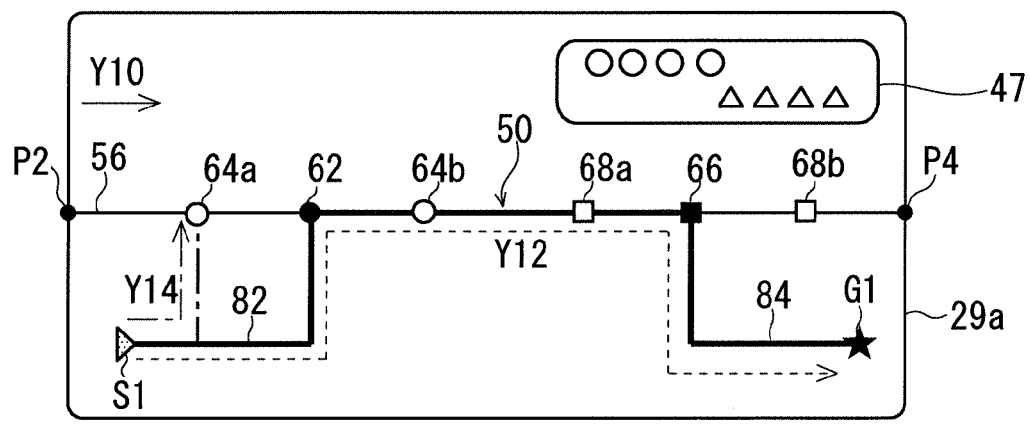
FIG. 7
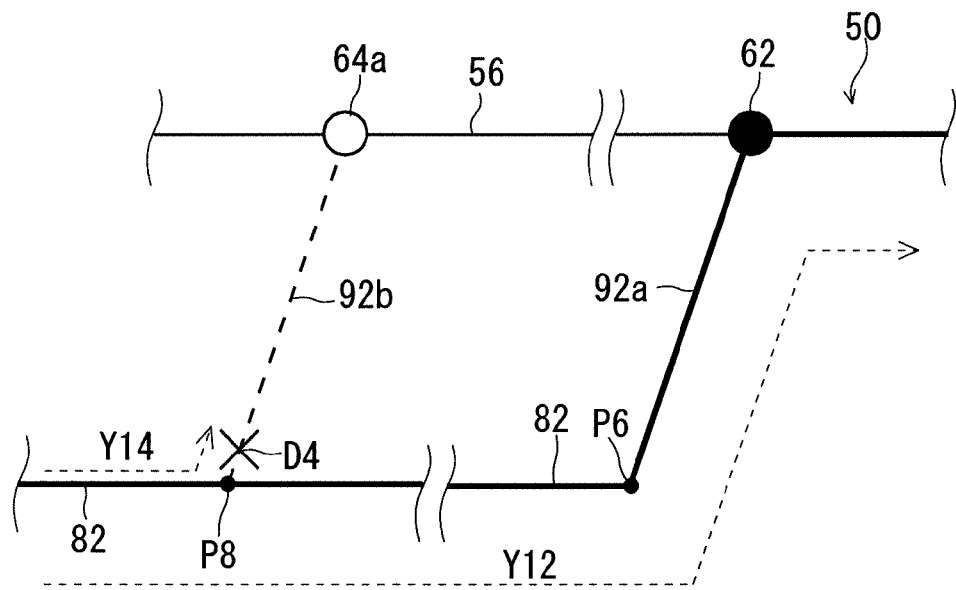
FIG. 8
THIS IS NOT DESIGNATED INTERCHANGE.
IC DESIGNATION WILL BE CANCELLED,
AND NEW ROUTE WILL BE GUIDED.

NAVIGATION DEVICE AND METHOD FOR NAVIGATING

TECHNICAL FIELD

The present invention relates to a navigation technology for a mobile body.

BACKGROUND ART

In recent years, a navigation device has been widespread, which searches and presents a route from a starting point to a destination, and thereby guides a mobile body to the destination along the searched route. In a case where a current position of the mobile body deviates from a guide route, then in general, the navigation device performs a re-search ("re-routing") for a route from the current position to the destination, and guides the re-searched route.

For example, a navigation device of Patent Document 1 determines that the re-search for the route is necessary in a case where a current position mark displayed on an expressway is corrected onto a general road by a dragging operation performed by a user. Then, the navigation device re-searches a route from the corrected current position to an entrance interchange located forward in a traveling direction, and guides the re-searched route.

PRIOR ART DOCUMENT

Patent Document

Patent Document 1: Japanese Patent Application Laid-Open No. 2009-36565

SUMMARY OF INVENTION

Problems to be Solved by the Invention

In an actual drive, there is a case where a user, who has driven a car in accordance with a guide route where the car enters an expressway from a designated interchange, deviates once from the guide route, for example, in order to drop in a shop and the like before entering the interchange, and thereafter, attempts to enter the expressway from another interchange. In this case, there is such a problem that the re-routing occurs many times on the way toward that another interchange, and every time of this occurrence, a route reaching the designated interchange is guided against an intention of the user. Moreover, for example, in a case where the user enters the expressway from an interchange different from the designated entrance interchange intentionally thereby, there is also such a problem that the re-routing occurs, and a route returning to the designated entrance interchange after going out once from the expressway is guided against the intention of the user.

Meanwhile, there is also a case where the user, who has deviated once from the guide route in order to drop in a shop and the like, attempts to enter the expressway from the designated interchange. In this case, only by detecting such single deviation from the guide route on the general road, the navigation device of Patent Document 1 cancels destination of the initially designated interchange and re-searches and guides a route toward a next interchange located forward in the traveling direction irrespective of the intention of the user. As described above, in the case where the designation of the interchange is not cancelled against the intention of the user, or on the contrary, is cancelled against the intention, there is such a problem that convenience for the user is lowered.

The present invention has been made in order to solve the problems as described above. An object of the present invention is to provide a navigation technology capable of enhancing the convenience for the user in the cancellation of the designation of the interchange on the guide route.

Means for Solving the Problems

A navigation device according to the present invention is a navigation device that performs route guidance for a mobile body, including: a route guide unit capable of presenting a guide route that passes through an interchange of an expressway, which is designated by a user; and a re-routing unit that cancels the designation of the interchange based on detection of a predetermined condition including at least one of a first condition, a second condition and a third condition, and performs re-routing for the guide route. Then, the first condition is a predetermined number of re-routings on a general road, which is two or more, the second condition is entrance of the mobile body to the expressway from an interchange different from the designated entrance interchange, and the third condition is entrance of the mobile body to the general road from an interchange located before the designated exit interchange in a traveling direction.

Moreover, a method for navigating according to the present invention is a method for navigating, which is for performing route guidance for a mobile body, the method including: a route guide step capable of presenting a route that passes through an interchange of an expressway, which is designated by a user; and a re-routing step of canceling the designation of the interchange based on detection of a predetermined condition including at least one of a first condition, a second condition and a third condition, and performing re-routing for the guide route, wherein the first condition is a predetermined number of re-routings on a general road, which is two or more, the second condition is entrance of the mobile body to the expressway from an interchange different from the designated entrance interchange, and the third condition is entrance of the mobile body to the general road from an interchange located before the designated exit interchange in a traveling direction.

Effects of the Invention

In accordance with the present invention, the designation of the interchange is cancelled based on the detection of the predetermined condition including at least one of the first condition, the second condition and the third condition, and the re-search for the route is performed. These conditions individually correspond to drive situations where the cancellation of the designation of the designated interchange is more desirable for the user. Hence, in the cancellation of the designation of the interchange on the guide route, the convenience for the user can be enhanced.

BRIEF DESCRIPTION OF DRAWINGS

FIG. 6 is a view for explaining cancellation of designation of an interchange according to a second condition.

FIG. 7 is a view for explaining the cancellation of designation of the interchange according to the second condition.

FIG. 8 is a view for explaining the cancellation of designation of the interchange according to the second condition.

DESCRIPTION OF EMBODIMENTS

Figure 1:
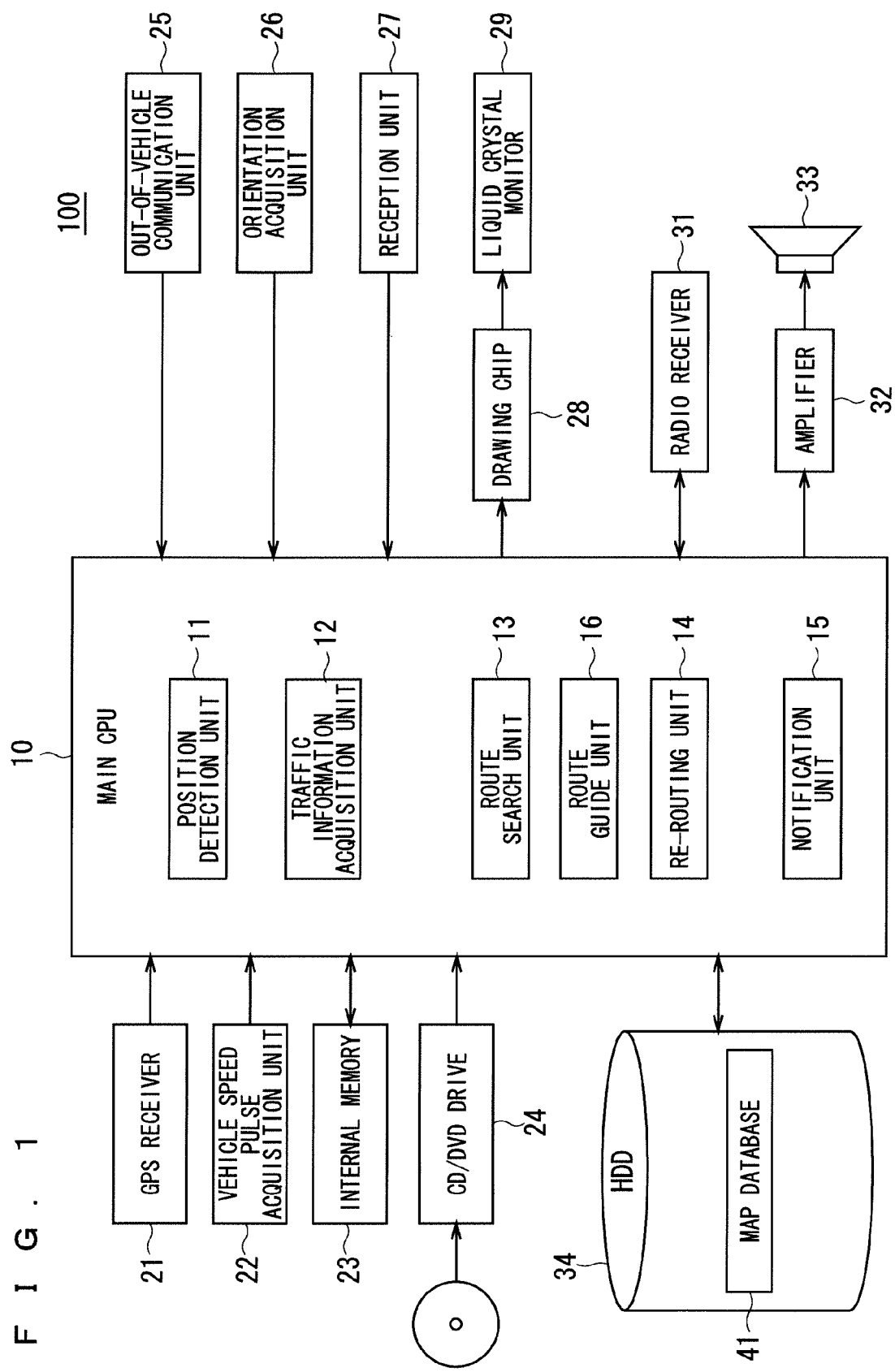
FIG. 1 is a block diagram showing a configuration example of a navigation device according to Embodiment 1.

A description is made below of an embodiment of the present invention based on the drawings. In the drawings, the same reference numerals are assigned to portions having similar configurations and functions, and duplicate descriptions are omitted in the following description. Moreover, the respective drawings are schematically shown, and sizes, positional relationships and the like of display items on the respective drawings are not necessarily accurately illustrated.

A. Embodiment 1

A-1. Entire Configuration of Navigation Device

FIG. 1 is a block diagram showing a configuration example of a vehicular navigation device 100 as an example of a navigation device according to Embodiment 1, which performs route guidance for a mobile body. The navigation device 100 is a navigation device mounted on a vehicle, and includes a main CPU 10; a GPS receiver 21; a vehicle speed pulse acquisition unit 22; an internal memory 23; a CD/DVD drive 24; an out-of-vehicle communication unit 25; an orientation acquisition unit 26; an HDD 34; and the like. The main CPU 10 controls the respective units of the navigation device 100 at predetermined timing in accordance with a stored program, and is thereby in charge of operation control for the whole of the navigation device 100. The GPS receiver 21 receives radio waves sent from GPS satellites, the vehicle speed pulse acquisition unit 22 acquires a vehicle speed pulse, which corresponds to a vehicle speed, from the vehicle, and the orientation acquisition unit 26 acquires orientation information of the vehicle. The out-of-vehicle communication unit 25 receives various types of traffic information such as control information, obstacle information and congestion information, for example, which are offered from FM multiple broadcast and transmitters such as a variety of beacons arranged along roads. In the HDD 34, a map database 41 is stored, and map information stored in the map database 41 includes information regarding intersections and roads, and in the information regarding the roads, for example, information regarding types of roads, such as a general road and an expressway, is set. The CD/DVD drive 24 is shown as an example of an input unit of the map information stored in the map database 41.

The navigation device 100 further includes: a liquid crystal monitor 29 that displays a map thereon; and a drawing chip 28 as an LSI that draws the map on the liquid crystal monitor 29 at a high speed; as well as a reception unit 27 as a user interface. The reception unit 27 is composed, for example, of a touch panel, operation buttons and the like. By operating the reception unit 27, a user can perform setting of a destination, designation of an entrance interchange and an exit interchange, which are desired to be used, setting of conditions for a route search, and the like. Moreover, a user's operation of permitting the cancellation of the designation of the interchanges, a user's operation of setting an operation mode of the navigation device 100, and the like are also received by the reception unit 27. Moreover, the navigation device 100 further includes: a radio receiver 31; an amplifier 32 and a speaker 33, which serve as a voice output unit.

The main CPU 10 also operates as a position detection unit 11, a traffic information acquisition unit 12, a route search unit 13, a re-routing unit 14, a notification unit 15, a route guide unit 16, and the like.

The position detection unit 11i sequentially detects a current position of the vehicle, which mounts the navigation device 100 thereon, in a predetermined cycle, for example, by using position information acquired by the GPS receiver 21, the vehicle speed pulse acquired by the vehicle speed pulse acquisition unit 22, the orientation information detected by the orientation acquisition unit 26, and the like. The traffic information acquisition unit 12 acquires the various types of traffic information such as the congestion information and the control information, which are received by the out-of-vehicle communication unit 25 from an out-of-vehicle information source.

For example, the route search unit 13 searches a guide route from a starting point to a destination based on a predetermined search condition. Then, in a case where the entrance interchange or exit interchange of the expressway is designated, the route search unit 13 searches a route including a section of the expressway, in which designated interchange is set as an entrance or an exit. As the search condition, various types of search conditions such as a condition for searching a shortest-distance route and a condition for searching a shortest-time route are employed. Setting of the search condition is performed by using a default value or in such a manner that the user operates the reception unit 27. The route guide unit 16 guides the user to the destination along the route searched by the route search unit 13. Moreover, the route guide unit 16 checks the guide route, which is searched by the route search unit 13, and the current position, which is detected by the position detection unit 11, against each other, and thereby detects the deviation of the mobile body such as the vehicle from the guide route.

In a case where the deviation of the mobile body from the guide route is detected by the route guide unit 16, the re-routing unit 14 performs a re-search ("re-routing") for a route.

Note that, in a case of having detected a predetermined condition including at least one of a first condition, a second condition and a third condition, which will be described later, the re-routing unit 14 cancels the designation of the interchanges designated by the user, and thereafter, performs the re-routing for the route. Contents of the first to third conditions are configured so as to be changeable based on a change of the program, and the like. The re-searched route is guided by the route guide unit 16. A description will be made later in detail of processing to be performed by the re-routing unit 14.

The notification unit 15 selects and displays a telop, which corresponds to a situation of cancelling the designation of an interchange, among various types of stored telops. For example, in a case where the re-routing unit 14 cancels the designation of the designated interchange, the notification unit 15 displays an effect that the cancellation will be performed as a telop on the liquid crystal monitor 29. Moreover, in order to enable the reception unit 27 to receive the user's operation of permitting the cancellation of the designation of the designated interchange, the notification unit 15 displays a telop, which includes an interface related to the user's operation, on the liquid crystal monitor 29. Moreover, in an event of displaying the telop, the notification unit 15 appropriately emits a predetermined beep sound, which is for letting the user know the presence of the telop, from the speaker 33.

A-2. Operations of Navigation Device

FIG. 17 to FIG. 21 are flowcharts showing an example of an operation flow S100 of the navigation device 100 according to Embodiment 1. The operation flow S100 shows an operation flow of the route guidance to be performed by the navigation device 100. A description is made below of the operations of the navigation device 100 along the flowcharts in FIG. 17 to FIG. 21. Note that the interchange is written as "IC" in FIG. 17 to FIG. 21.

Figure 17:
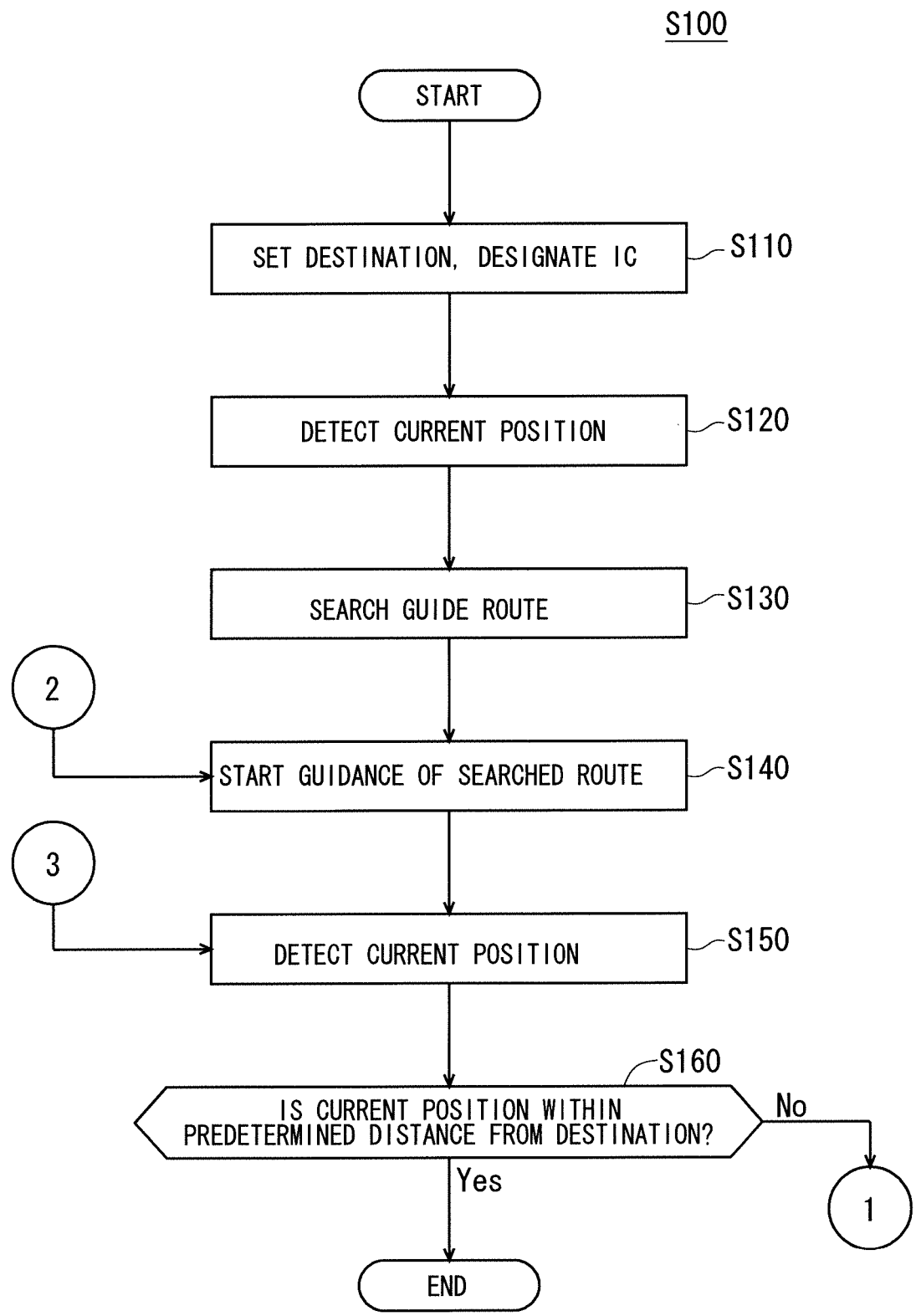
FIG. 17 is a flowchart showing an example of operations of a navigation device according to Embodiment 1.
Figure 18:
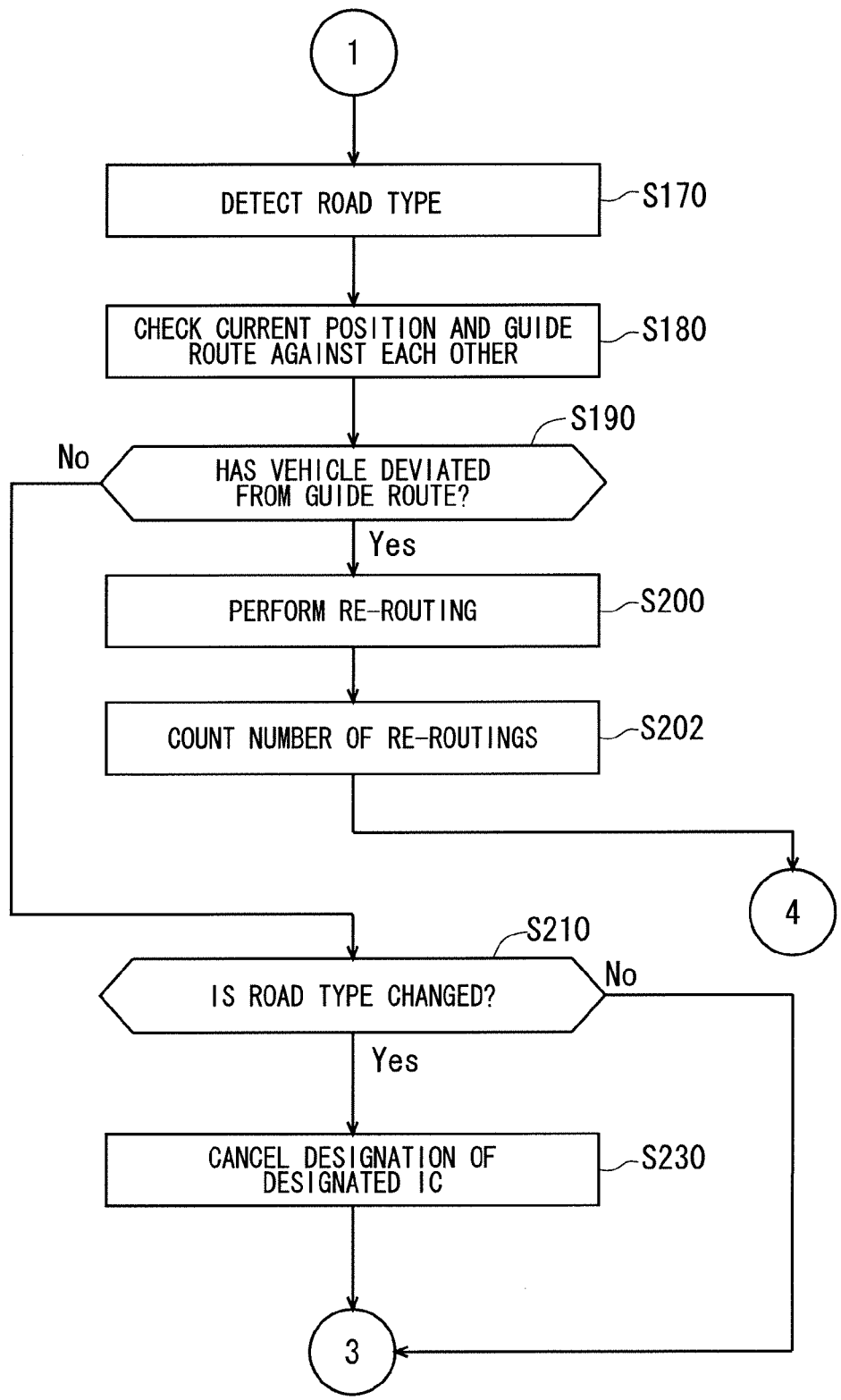
FIG. 18 is a flowchart showing the example of the operations of the navigation device according to Embodiment 1.
Figure 19:
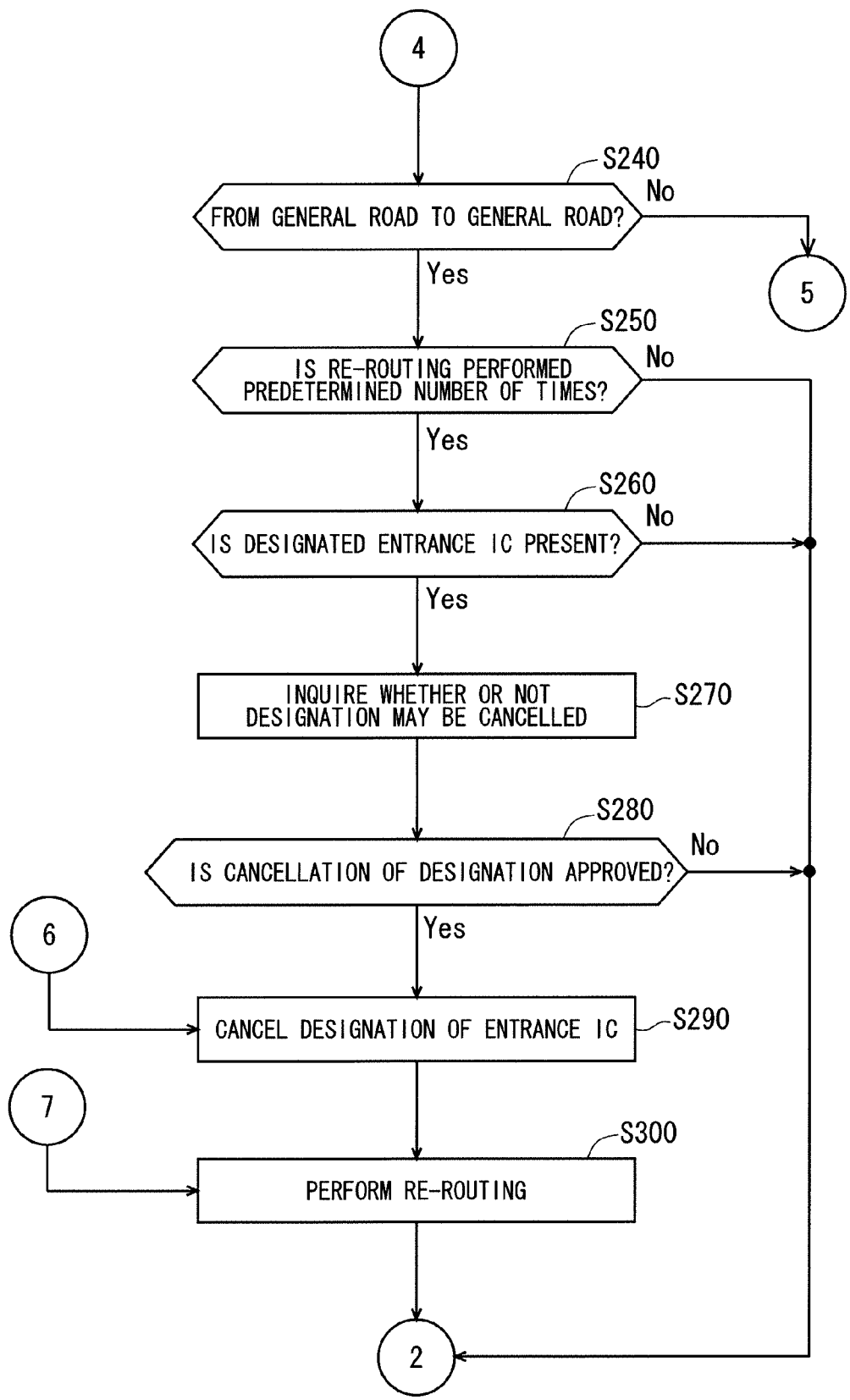
FIG. 19 is a flowchart showing the example of the operations of the navigation device according to Embodiment 1.

As shown in FIG. 17, when the operation flow S100 is started, the user performs an operation of indicating a desired point on the map, which is displayed on the liquid crystal monitor 29, through the reception unit 27, an operation of selecting the desired point from a list of facilities, interchanges and the like, which is displayed on the liquid crystal monitor 29, and the like, and thereby performs setting of the destination, designation of the interchange to be passed through, and the like (Step S110).

When the setting of the destination, and the like are performed, the position detection unit 11 detects the current position of the vehicle (Step S120) based on the information acquired from the GPS receiver 21, the vehicle speed pulse acquisition unit 22 and the orientation acquisition unit 26. Next, the route search unit 13 searches a route to the destination, which is set while taking the current position as a starting point (Step S130).

Figure 2:
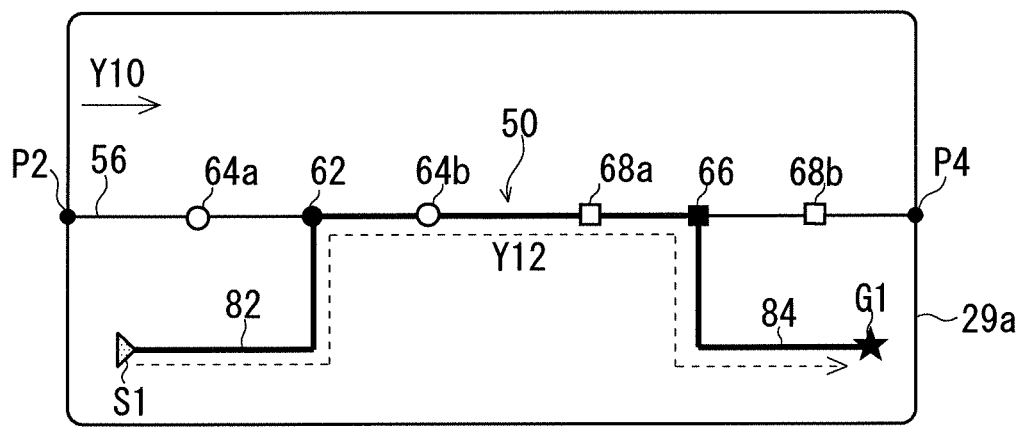
FIG. 2 is a view showing an example of a guide route according to Embodiment 1.

FIG. 2 is a view showing an example of the guide route according to Embodiment 1. As shown in FIG. 2, on a screen 29a of the liquid crystal monitor 29, a portion from a point P2 to a point P4 in an expressway 56 on which the vehicle is capable of driving only in a direction of an arrow Y10 is displayed. Interchanges 62, 64a and 64b are entrance interchanges for allowing the vehicle to enter the expressway 56 from the general road. Among them, the entrance interchange 62 is designated as an entrance to the expressway 56 by the user. Interchanges 66, 68a and 68b are exit interchanges for allowing the vehicle to enter the general road from the expressway 56. The exit interchange 66 is designated as an exit from the expressway 56 to the general road by the user. A current position S1 is the current position of the vehicle, which is detected by the position detection unit 11, and a destination G1 is the set destination. A guide route 50 is a guide route reaching the destination G1 from the current position S1 along an arrow Y12, and is searched by search processing in Step S130. The guide route 50 includes: a general road 82 from the current position S1 to the entrance interchange 62; a section from the entrance interchange 62 to the exit interchange 666 in the expressway 56; and a general road 84 from the exit interchange 66 to the destination G1. When the search for the route is completed, the route guide unit 16 displays the guide route on the map, which is displayed on the screen 29a, so that the guide route can be distinguishable from other roads, and the like, and thereby starts the guidance of the route (Step S40). Note that, in the drawings of this application, the guide route is displayed by a bold solid line.

When the route guidance is started, the position detection unit 11 detects the current position of the vehicle (Step S150). Then, the route guide unit 16 determines whether or not the detected current position is within a predetermined distance from the set destination (Step S160), and if the detected current position is within the predetermined distance, determines that the vehicle has reached the destination, and the operation flow S100 related to the route guidance is ended. In a case where the current position is not within the predetermined distance from the destination, the route guide unit 16 checks the current position of the vehicle and road information of the map against each other, and detects a road type of the road on which the current position is present (Step S170). Then, the route guide unit 16 checks the guide route and the current position against each other (Step S180), and thereby determines whether or not the vehicle has deviated from the guide route (Step S190).

In a case where it is determined that the vehicle does not deviate from the guide route as a result of the determination in Step S190, the route guide unit 16 compares a road type of a road on which a previously detected current position of the vehicle was present and a road type of a road on which a currently detected current position of the vehicle is present with each other. Then, based on a result of the comparison, the route guide unit 16 determines whether or not the road type is changed (Step S210). If it is determined that the road type is not changed as a result of the determination in Step S210, then the processing is returned to Step S150, and processing on and after this step is performed. If it is determined that the road type is changed as a result of the determination in Step S210, then the route guide unit 16 cancels the designation of the interchange (Step S230). For example, in a case where the vehicle has entered the expressway 56 from the designated entrance interchange 62 in accordance with the guide route 50 shown in FIG. 2, the designation of the entrance interchange 62 is cancelled. In a similar way, in a case where the vehicle has entered the general road 84 from the designated exit interchange 66, the designation of the exit interchange 66 is cancelled. When the designation of the designated interchange is cancelled, the processing is returned to Step S150, and the processing related to steps on and after this step is performed. Note that, in the route guide unit 16 and the re-routing unit 14, it is determined that the vehicle has passed through the entrance interchange, for example, in a case where the road type is changed from the general road to a ramp way (or the expressway). Moreover, it is determined that the vehicle has passed through the exit interchange in a case where the road type is changed from the expressway to the ramp way (or the general road). Then, a determination as to whether or not the designated interchange is passed through is performed, for example, in such a manner that a point where the change of the road type is detected and a place of the designated interchange are checked against each other and the like.

If the vehicle has deviated from the guide route as a result of the determination in Step S190, then the re-routing unit 14 performs the re-search (re-routing) for a route from the current position to the destination (Step S200). Moreover, the re-routing unit 14 performs counting for the number of re-routings (Step S202).

A-2-1. Operations Regarding the First Condition

When the re-routing in Step S200 (FIG. 18) is performed, the re-routing unit 14 determines whether or not, in an event where the re-routing occurs, both of road types of the roads, which the current positions of the vehicle before and after the occurrence of the re-routing are present on, are the general road, based on the information about the road types of the roads on which the current positions of the vehicle having been detected by the route guide unit 16 are present (Step S240). If both of the road types before and after the occurrence of the re-routing are the general road as a result of the determination, then it is found out that the re-routing occurs on the general road, and the re-routing unit 14 determines whether or not a predetermined number of times of the re-routing (also referred to as "first condition") occurs (Step S250). Here, the predetermined number of times is defined to be two or more. Note that the predetermined number of times is stored in advance as a default value or by being set by the user through the reception unit 27.

If the number of re-routings is less than the predetermined number of times as a result of the determination in Step S250 (FIG. 19), then the processing is returned to Step S140 (FIG. 17), and a new route searched by the re-routing in Step S200 (FIG. 18) is guided by the route guide unit 16. Then, the processing on and after Step S140 is performed one more time. If the number of re-routings has reached the predetermined number of times as a result of the determination in Step S250 (FIG. 19), then the re-routing unit 14 determines whether or not the designated entrance interchange is present (Step S260).

Figure 3:
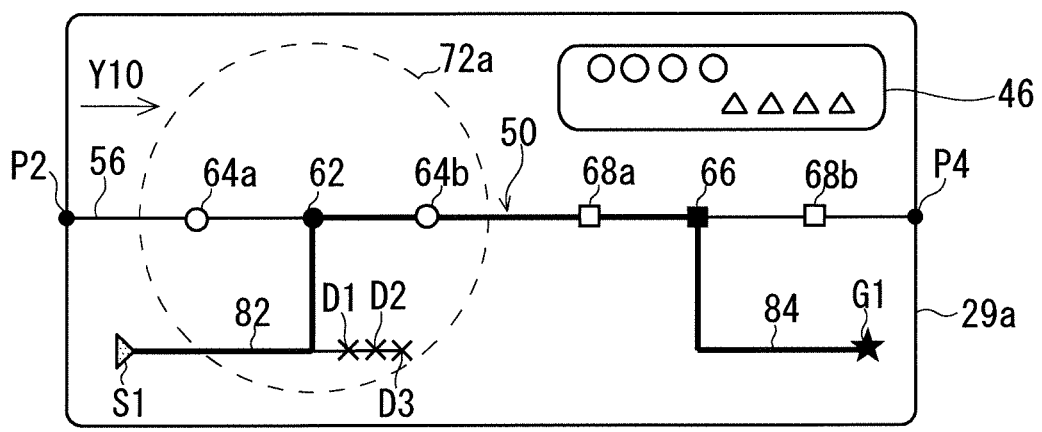
FIG. 3 is a view for explaining cancellation of designation of an interchange according to a first condition.
Figure 4:
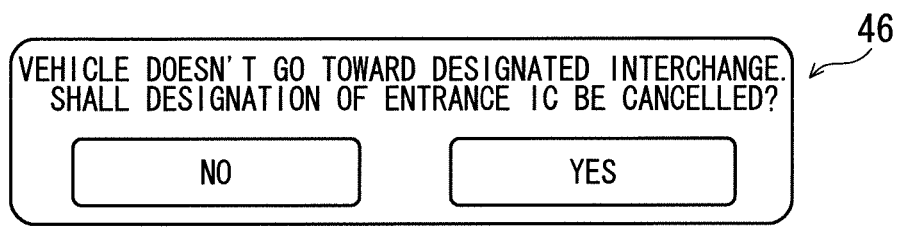
FIG. 4 is a view for explaining the cancellation of designation of the interchange according to the first condition.
Figure 5:
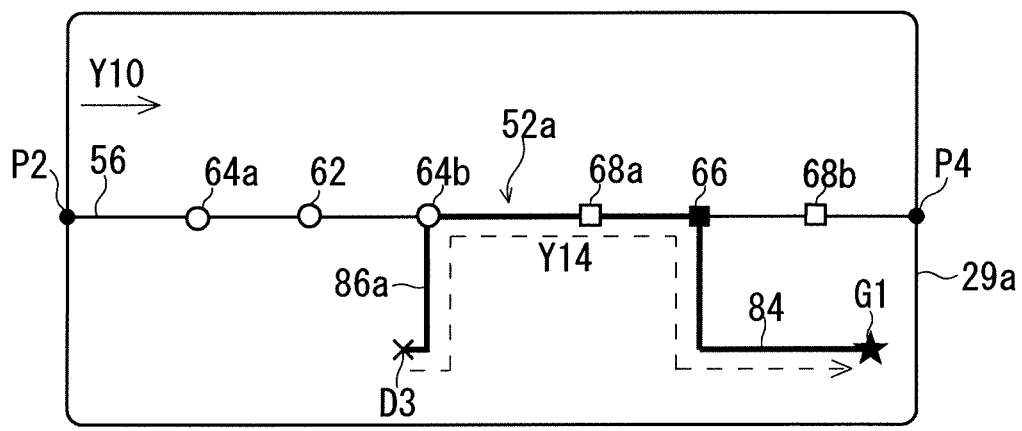
FIG. 5 is a view for explaining the cancellation of designation of the interchange according to the first condition.

FIG. 3 to FIG. 5 are views for explaining the cancellation of the designation of the interchange according to the first condition. FIG. 3 shows an example of a case where the first condition is detected based on a traveling pattern of the vehicle that is traveling in accordance with the guide route 50 shown in FIG. 2, FIG. 4 shows an example of a telop 46 related to the cancellation of the designation of the interchange according to the first condition, and FIG. 5 is a view showing an example of a route to be searched by re-routing after the designation of the interchange is cancelled in the example of FIG. 3. Moreover, in the example of FIG. 3 to FIG. 5, three times is set in advance as the predetermined number of times according to the first condition.

In the example shown in FIG. 3, a point D1 is a point where the deviation of the vehicle from the guide route 50 is first detected on the general road. Hence, at the point D1, the first re-routing (Step S200) occurs. A point D2 is a point where deviation of the vehicle from a guide route (not shown) re-searched by the first re-routing is first detected on the general road. Hence, at the point D2, the second re-routing (Step S200) occurs. A point D3 is a point where deviation of the vehicle from a guide route (not shown) re-searched by the second re-routing is first detected. Hence, at the point D3, the third re-routing (Step S200) occurs. As a result, it is determined that the number of re-routings has reached the predetermined number of times at the point D3 (Step S250).

In a case where the designated entrance interchange is not present as a result of the determination in Step S260, the processing is returned to Step S140 (FIG. 17). In the case where the designated entrance interchange is present as a result of this determination, the notification unit 15 inquires of the user whether or not the designation of the entrance interchange may be cancelled (Step S270). Specifically, the notification unit 15 makes the inquiry whether or not the designation may be cancelled, for example, by displaying the telop 46 (FIG. 3, FIG. 4) on the screen 29a of the liquid crystal monitor 29 and the like. Then, whether or not the designation may be cancelled is decided in such a manner that the user operates an interface related to setting as to whether or not the designation may be cancelled, the interface being provided on the telop 46.

In response to a response from the user to the inquiry in Step S270 as to whether or not the designation may be cancelled, the re-routing unit 14 determines whether or not the cancellation of this designation is approved (Step S280). In a case where it is determined that the cancellation of the designation is not approved as a result of this determination, then the designation of the designated entrance interchange is not cancelled, and the processing is returned to Step S140. In a case where it is determined that the cancellation of the designation is approved as a result of the determination in Step S280, then the designation of the designated entrance interchange is cancelled (Step S290).

Then, after completing the cancellation of the designation, the re-routing unit 14 performs the re-routing one more time, and re-searches a new route (Step S300). When this re-routing is completed, the processing is returned to Step S140 (FIG. 17), and the route guide unit 16 starts route guidance using the route re-searched in Step S300, and performs the processing on and after Step S140.

For the example shown in FIG. 3, as shown in FIG. 5, the re-routing unit 14 cancels the designation of the designated entrance interchange 62 based on the detection of the first condition at the point D3, and re-searches a route 52a. The route 52a is a route reaching the destination G1 from the point D3 along an arrow Y14. The route guide unit 16 starts route guidance using the re-searched route 52a.

Note that there is a case where, for the display of the telop 46 in Step S270, the user operates the reception unit 27 while the telop is displayed and displays a screen other than a map screen, for example, a MENU screen on the liquid crystal monitor 29 (the telop is removed at this point of time) and displays the map screen one more time thereafter. In such a case, the notification unit 15 does not display the telop 46 on the man screen thus re-displayed. In a case where the re-routing occurs from this situation one more time, the notification unit 5S performs the display of the telop 46. Moreover, in a case where the vehicle has entered the expressway from an interchange different from the designated interchange during the display of the telop 46, for example, the notification unit 15 displays a telop 47 (FIG. 8), which will be described later, in place of the telop 46.

Incidentally, as the designated entrance interchange is being farther from the current position of the vehicle, there is increased a possibility that the first condition may be detected and the designation of the entrance interchange may be cancelled even if the user intends to enter the expressway from this entrance interchange. Accordingly, among such cases where the first condition is detected, only in a case where the point where the first condition is detected is located within a predetermined distance range from the designated entrance interchange, the re-routing unit 14 may also cancel the designation of the entrance interchange and perform the re-search for the route. As described above, a distance restriction is provided to the cancellation of the designation of the interchange in the event where the first condition is detected, whereby an occurrence rate of the case where the designation of the interchange is cancelled irrespective of an intention of the user can be suppressed. For example, in the example shown in FIG. 3, the point D3 is included in a circle 72a with a predetermined radius, which takes the designated entrance interchange 62 as a center. As this radius, a distance is set in advance, at which it is assumed that a possibility that convenience for the user may be damaged is low even if the designation of the entrance interchange 62 is cancelled based on the detection of the first condition. Then, the designation of the entrance interchange 62 is cancelled based on the detection of the first condition at the point D3, and the route is re-searched. Note that, for example, a rectangle, which occupies predetermined distance ranges with respect to an east-west direction and a south-north direction while taking the entrance interchange 62 as a center, or the like may be used in place of the circle 72a.

Note that, even if the designation of the interchange is cancelled based on the detection of the first condition without being subjected to the inquiry as to whether or not the designation may be cancelled, the possibility that the designation of the interchange may be cancelled against the intention of the user is reduced as the predetermined number of times related to the detection of the first condition is being larger. Hence, utility of the present invention is not damaged even if the processing of Step S270 by the notification unit 15 and the determination of Step S280 are not performed.

A-2-2. Operations Regarding the Second Condition

Figure 20:
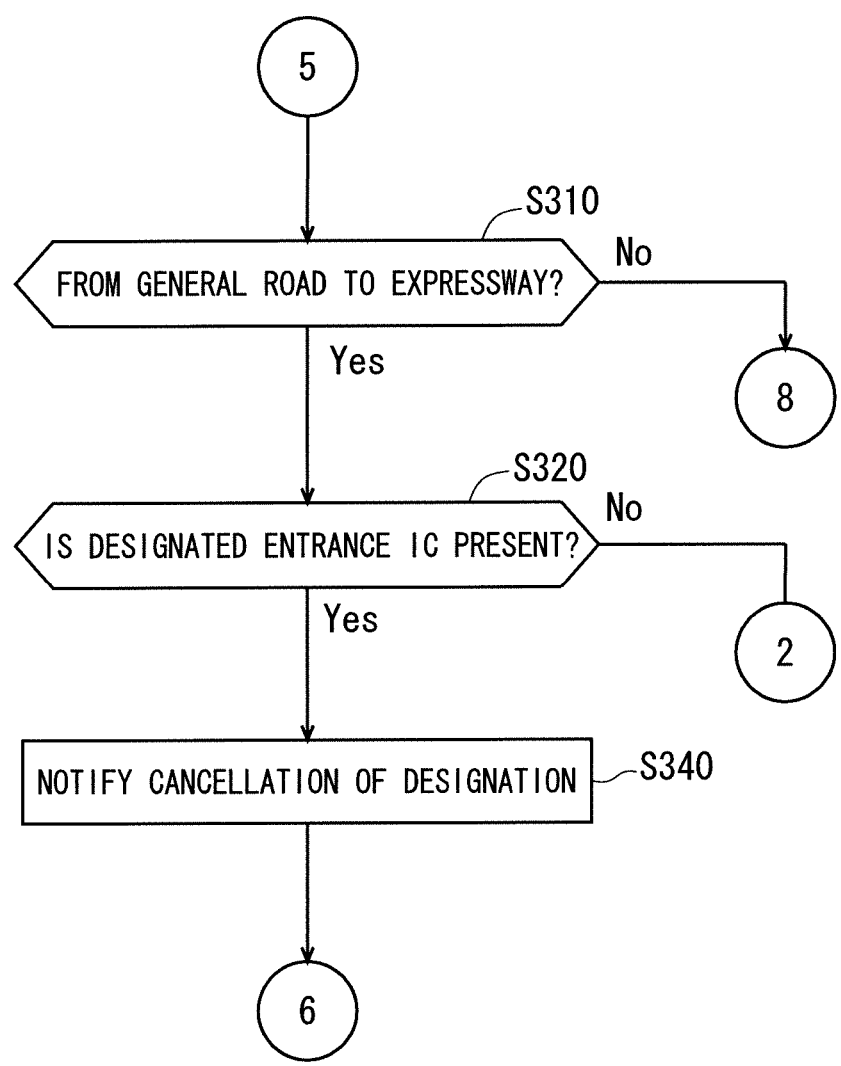
FIG. 20 is a flowchart showing the example of the operations of the navigation device according to Embodiment 1.

In the determination in Step S240, in a case where at least one of the road types before and after the occurrence of the re-routing is not the general road, that is, in a case where the point where the re-routing occurs is not on the general road, the re-routing unit 14 determines whether or not the road type is changed from the general road to the expressway in the event where the re-routing occurs (Step S310 in FIG. 20).

In a case where the road type is changed from the general road to the expressway in the event of the occurrence of the re-routing as a result of the determination in Step S310, the re-routing unit 14 determines whether or not the designated entrance interchange is present (Step S320). In a case where it is determined that the designated entrance interchange is present in this determination processing, this stands for that entrance of the vehicle (mobile body) to the expressway from the interchange different from the designated entrance interchange (this entrance is also referred to as "second condition") is detected.

Figure 9:
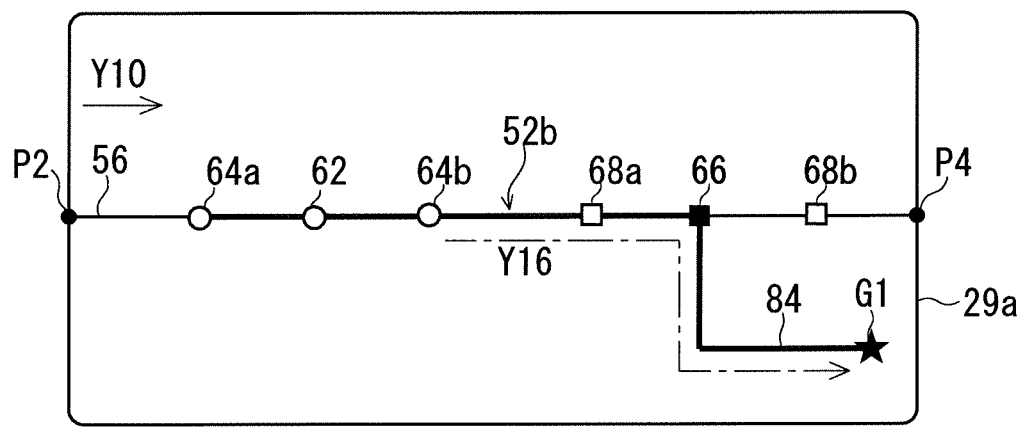
FIG. 9 is a view for explaining the cancellation of designation of the interchange according to the second condition.
Figure 10:
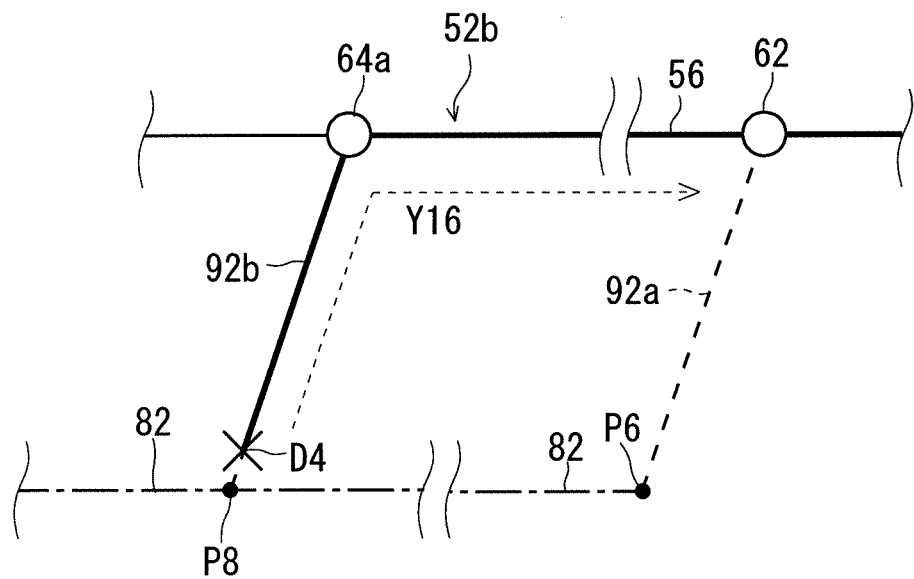
FIG. 10 is a view for explaining the cancellation of designation of the interchange according to the second condition.

FIG. 6 to FIG. 10 are views for explaining the cancellation of the designation of the interchange according to the second condition. FIG. 6 and FIG. 7 show an example of a case where the second condition is detected based on a traveling pattern of the vehicle that is traveling in accordance with the guide route 50 shown in FIG. 2. In FIG. 7, vicinities of the entrance interchanges 62 and 64a in a map displayed in FIG. 6 are enlargedly displayed. FIG. 8 shows an example of a telop 47 related to the cancellation of the designation of the interchange according to the second condition and the third condition that will be described later. FIG. 9 and FIG. 10 are views showing a guide route 52b as an example of a route to be searched by re-routing after the designation of the interchange is cancelled in the example of FIG. 6 and FIG. 7. In FIG. 10, vicinities of the entrance interchanges 62 and 64a in a map displayed in FIG. 9 are enlargedly displayed.

As shown in FIG. 6 and FIG. 7, a road 92b is a ramp way reaching the entrance interchange 64a, which is located before the designated entrance interchange 62 in the traveling direction of the guide route 50, from a point P8 on the general road 82. Moreover, by a ramp way 92a reaching the designated entrance interchange 62 from a point P6 on the general road 82, the general road 82 and the entrance interchange 62 are connected to each other.

As shown in FIG. 6 and FIG. 7, the vehicle, which has traveled in accordance with the guide route 50, deviates from the general road 82 of the guide route 50 along the arrow Y14 at the point P8, and reaches a point D4 on the ramp way 92b. In this case, the re-routing unit 14 detects the second condition by the determination processing of Steps S310 and S320 in FIG. 20. Note that, in the example of FIG. 6 and FIG. 7, the vehicle has reached the point D4 before the first condition already described is detected.

In a case where it is determined that the designated entrance interchange is not present as a result of the determination in Step S320, the processing is returned to Step S140 (FIG. 17), and the processing on and after this step is performed. In a case where it is determined that the designated entrance interchange is present as a result of the determination in Step S320, the notification unit 15 performs notification of the cancellation of the designation of the designated entrance interchange by displaying the telop 47 (FIG. 6, FIG. 8) on the screen 29a and the like (Step S340). Thereafter, the re-routing unit 14 cancels the designation of the designated entrance interchange (Step S290 in FIG. 19), performs the re-routing after this cancellation of the designation is completed, and re-searches a new route (Step S300). That is to say, the re-routing unit 14 cancels the designation of the designated interchange based on the detection of the second condition, and performs the re-search for the route. In FIG. 9 and FIG. 10, the guide route 52b, which is re-searched by the re-routing processing of Step S300 with respect to an example of the traveling pattern of the vehicle shown in FIG. 6 and FIG. 7, is shown. As shown in FIG. 9 and FIG. 10, the route 52b is a route reaching the destination G1 from the point D4 along an arrow Y16. When the re-routing in Step S300 (FIG. 19) is completed, the processing is returned to Step S140 (FIG. 17), and the route guide unit 16 starts the route guidance using the route re-searched in Step S300, and in addition, performs the processing on and after Step S140.

Note that FIG. 6 to FIG. 10 show an example of the case where the vehicle, which has deviated from the guide route 50, enters the expressway 56 from the entrance interchange 64a located before the entrance interchange 62 in the traveling direction of the guide route 50. Also in this case, the re-search for the route is performed after the second condition is detected when the vehicle enters the ramp way that connects the general road and the interchange 64a to each other and the designation of the entrance interchange 62 is cancelled.

Incidentally, the entrance interchange includes one, through which the vehicle is capable of individually entering an expressway which the user has intended to enter and entering an expressway in which a direction where the vehicle is capable of traveling is different from that of this expressway. In a case where erroneous entrance of the vehicle from the entrance interchange to that different expressway occurs, the second condition is detected at a point of time when the vehicle deviates from the guide route, and the designation of the designated entrance interchange is cancelled.

A-2-3. Operations Regarding the Third Condition

Figure 21:
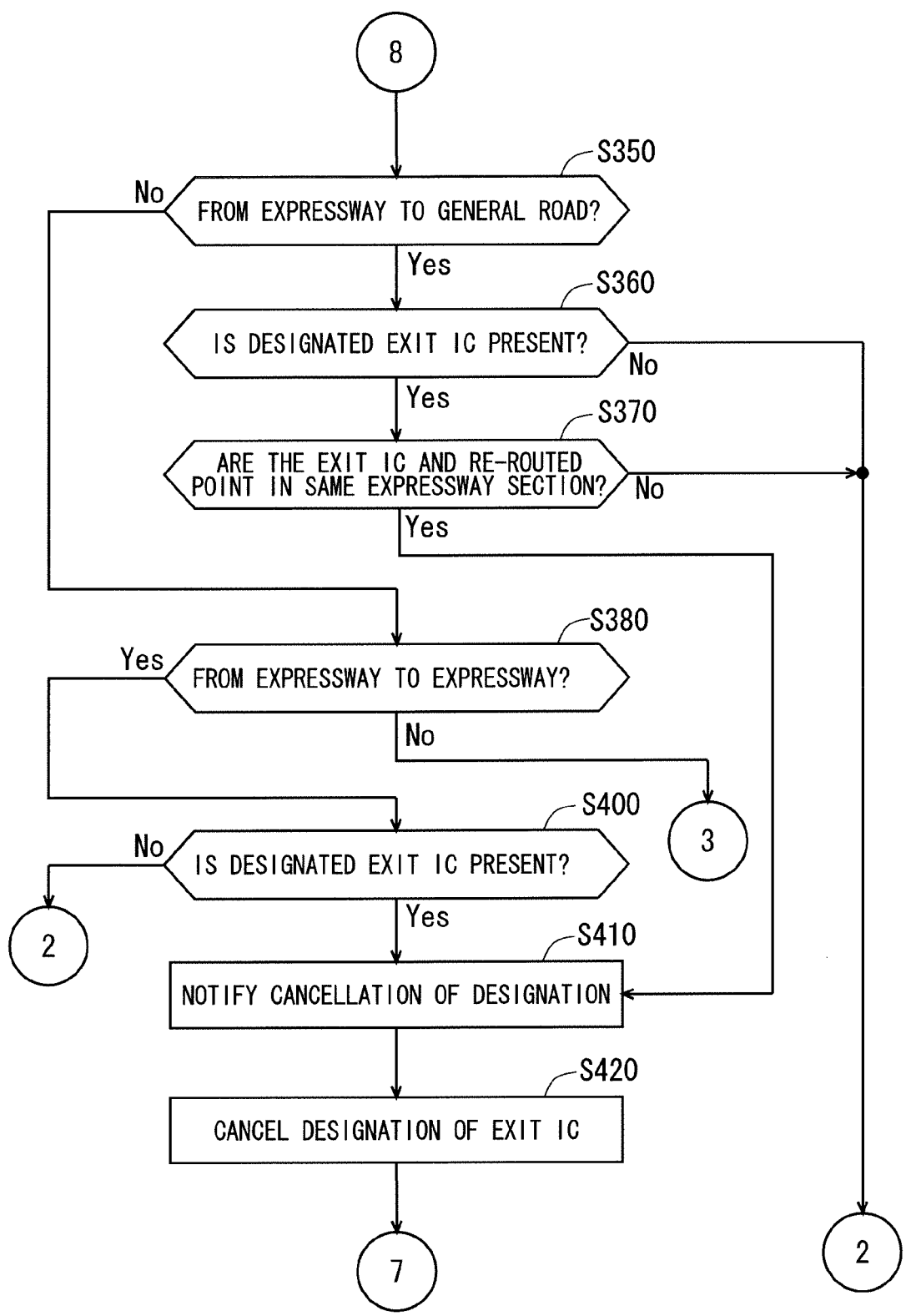
FIG. 21 is a flowchart showing the example of the operations of the navigation device according to Embodiment 1.

In the determination of Step S310 (FIG. 20), in a case where it is determined that the road type is not changed from the general road to the expressway in the event where the re-routing occurs, the re-routing unit 14 determines whether or not the road type is changed from the expressway to the general road in the event where the re-routing occurs (Step S350 in FIG. 21). Based on such a change of the road type, the re-routing unit 14 can sense passage of the vehicle through the exit interchange.

In a case where it is determined that the road type is changed from the expressway to the general road in the event where the re-routing occurs as a result of the determination in Step S350, the re-routing unit 14 determines whether or not a designated exit interchange is present (Step S360). In a case where it is determined that the designated exit interchange is present in this determination processing, this stands for that entrance of the vehicle (mobile body) to the general road from an interchange located before the designated exit interchange in the traveling direction (this entrance is also referred to as "third condition") is detected.

Figure 11:
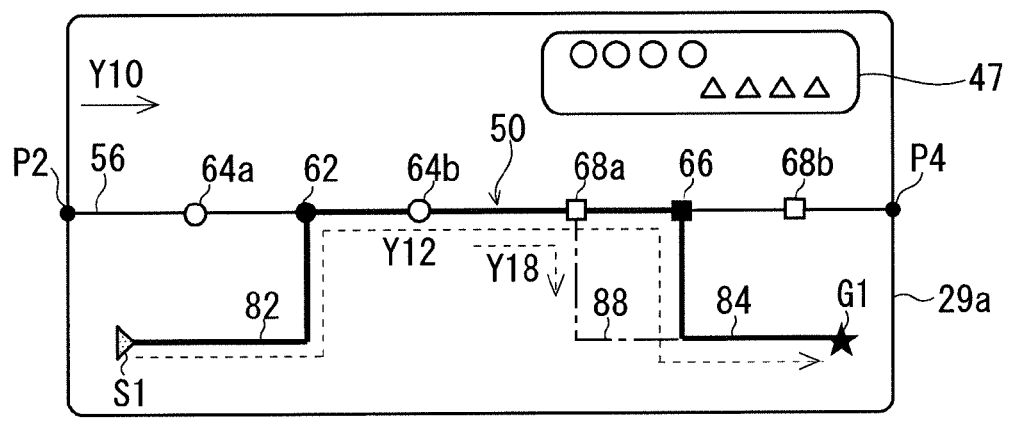
FIG. 11 is a view for explaining cancellation of designation of an interchange according to a third condition.
Figure 12:
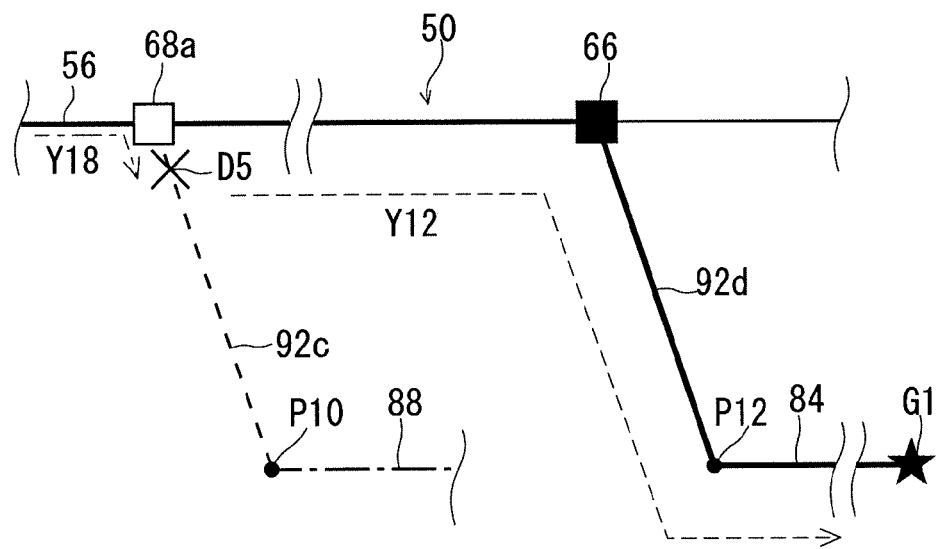
FIG. 12 is a view for explaining the cancellation of designation of the interchange according to the third condition.
Figure 13:
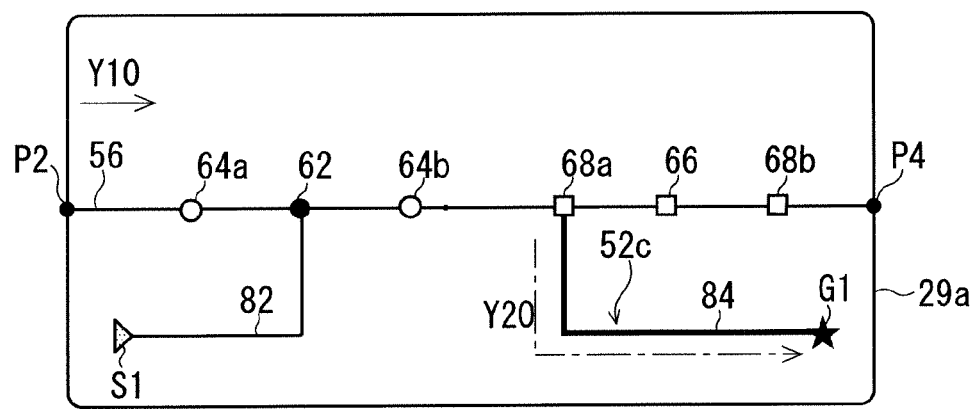
FIG. 13 is a view for explaining the cancellation of designation of the interchange according to the third condition.
Figure 14:
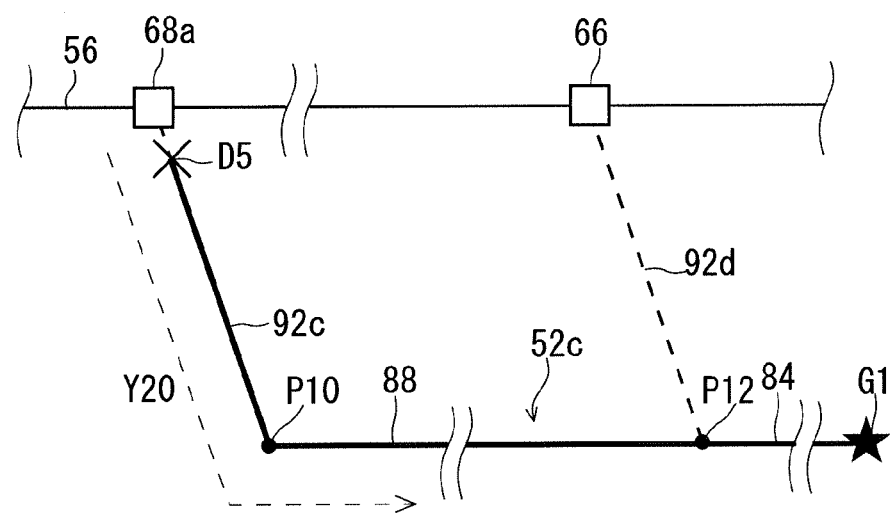
FIG. 14 is a view for explaining the cancellation of designation of the interchange according to the third condition.
Figure 15:
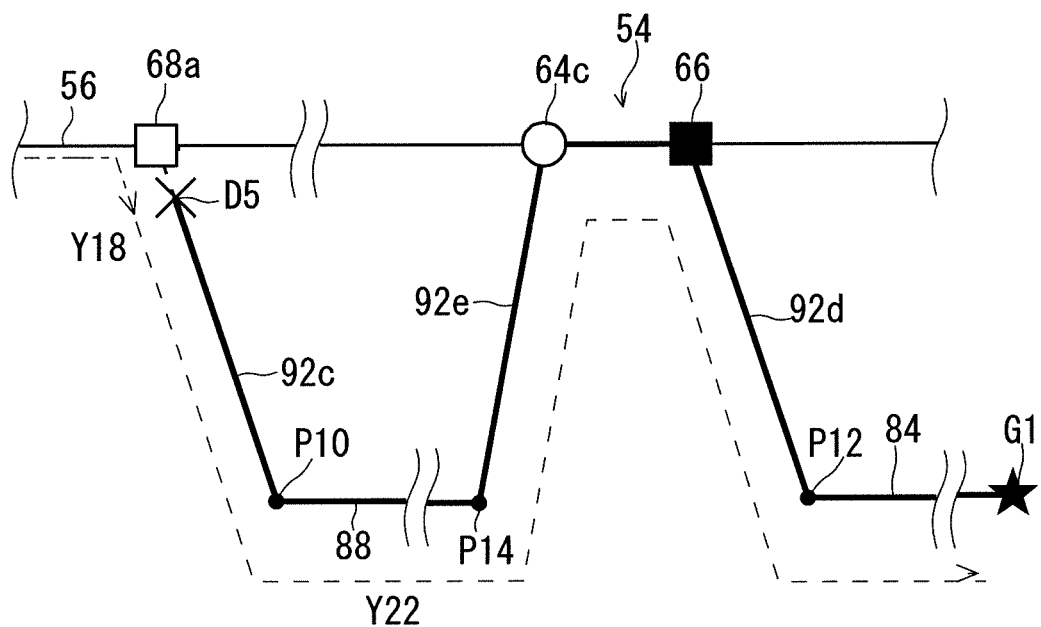
FIG. 15 is a view for explaining the cancellation of designation of the interchange according to the third condition.
Figure 16:
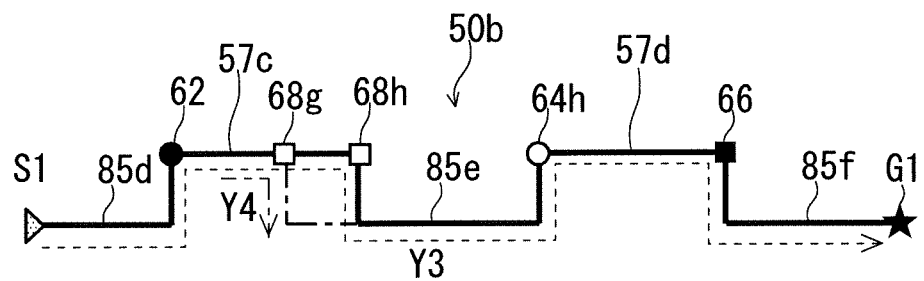
FIG. 16 is a view for explaining the cancellation of designation of the interchange according to the third condition.

FIG. 11 to FIG. 16 are views for explaining the cancellation of the designation of the interchange according to the third condition. FIG. 11 and FIG. 12 show an example of a case where the third condition is detected based on a traveling pattern of the vehicle that is traveling in accordance with the guide route 50 shown in FIG. 2. In FIG. 12, vicinities of the exit interchanges 66 and 68*a* in a map displayed in FIG. 11 are enlargedly displayed. FIG. 13 and FIG. 14 are views showing a guide route 52*c* as an example of a guide route to be searched by re-routing after the designation of the exit interchange is cancelled in the example of FIG. 11 and FIG. 12. In FIG. 14, vicinities of the exit interchanges 66 and 68*a* in a map displayed in FIG. 13 are enlargedly displayed. FIG. 15 is a view for explaining an example of a detection method of the third condition. Moreover, FIG. 16 is a view for explaining processing in a case where the third condition is detected in a case where a plurality of expressway sections are included in the route 50*b* searched by the route search unit 13.

In FIG. 11 and FIG. 12, a general road 88 is a general road, which connects, to each other, the general road 84 and the exit interchange 68*a* located before the designated exit interchange 66 in the traveling direction of the guide route 50. More specifically, as shown in FIG. 12, the exit interchange 68*a* and the general road 88 are connected to each other by a ramp way 92*c* reaching a point P10 from the exit interchange 68*a*. In a similar way, the exit interchange 66 and the general road 84 are connected to each other by a ramp way 92*d* reaching a point P12 from the exit interchange 66.

As shown in FIG. 11 and FIG. 12, the vehicle, which has traveled in accordance with the guide route 50, deviates from the guide route 50 from the exit interchange 68*a* along an arrow Y18, and reaches a point D5 on the ramp way 92*c*.

In a case where it is determined that the designated exit interchange is not present as a result of the determination of Step S360, the processing is returned to Step S140 (FIG. 17), and the processing on and after this step is performed. In a case where it is determined that the designated exit interchange is present as a result of this determination, the re-routing unit 14 determines whether or not this exit interchange and an occurrence point of the re-routing are present in the same expressway section (Step S370). The determination of Step S370 will be described later.

In a case where it is determined that both are not present in the same expressway section as a result of that determination, the processing is returned to Step S140, and the processing on and after this step is performed, in a case where it is determined that both are present in the same expressway section as a result of the determination in Step S370, the notification unit 15 performs notification of the cancellation of the designation of the designated exit interchange by displaying a telop on the screen 29*a* and the like (Step S410). Thereafter, the re-routing unit 14 cancels the designation of the designated exit interchange (Step S420), performs the re-routing one more time after this cancellation of the designation is completed, and re-searches a new route (Step S300 in FIG. 19). In FIG. 13 and FIG. 14, the route 52*c*, which is re-searched by the re-routing processing of Step S300 with respect to an example of the traveling pattern of the vehicle, which is shown in FIG. 11 and FIG. 12, is shown. As shown in FIG. 13 and FIG. 14, the route 52*c* is a route reaching the destination G1 from the point D5 along an arrow Y20. When the re-routing in Step S300 is completed, the processing is returned to Step S140 (FIG. 17), and the route guide unit 16 starts the route guidance using the route re-searched in Step S300, and in addition, performs the processing on and after Step S140.

Regarding Another Example of Detection Method of the Third Condition:

FIG. 15 is a view for explaining an example of another technique for allowing the re-routing unit 14 to detect the third condition. A guide route 54 is a route, which is re-searched by the re-routing when the vehicle reaches the point D5, the vehicle having deviated from the guide route 50 (FIG. 12) in a state where the designation of the exit interchange 66 is not cancelled. The guide route 54 is a route reaching the destination G1 from the point D5 along an arrow Y22, and includes the ramp way 92*c*, the general road 88, a ramp way 92*e*, a part of the expressway 56, the ramp way 92*d*, and the general road 84. The points P10, P12 and P14, the entrance interchange 64*c* and the exit interchange 66 on the guide route 54 are end portions of these respective roads. Here, for example, the ramp way is treated as "expressway" when the vehicle enters the expressway from the general road, and is treated as "general road" when the vehicle enters the general road from the expressway. In this case, the guide route 54 includes three sections distinguishable by a change of the road type on the route, which are: a general road section from the point D5 to the point P14; an expressway section from the point P14 to the exit interchange 66; and a general road section from the exit interchange 66 to the destination G1. Meanwhile, in a case the vehicle has traveled without deviating from the guide route 50, an untraveled portion in the guide route 50 includes two sections distinguishable by the change of the road type on the route, which are: an expressway section to the exit interchange 66; and the general road section from the exit interchange 66 to the destination G1. As described above, in the case where the third condition occurs, the number of sections described above is increased with respect to the case where the third condition does not occur. Hence, the re-routing unit 14 obtains the number of sections in the guide route individually in a case before the occurrence of the re-routing and after the occurrence of the re-routing, and detects a difference between the number of sections before the occurrence and the number of sections after the occurrence, and can thereby detect the third condition.

Incidentally, service areas of the expressway also include a special service area via which the vehicle can enter the expressway one more time, and in addition, can enter the general road. As mentioned above, if the detection of the third condition is performed based on the difference in the number of sections in which the road types are different, then it becomes possible to accurately detect the third condition even in a case where the vehicle that has come out of this special service area deviates from the guide route.

Supplementary Explanation of Determination in Step S370 (FIG. 21):

The route 50b shown in FIG. 16 is a route reaching the destination G1 from the current position S1 along an arrow Y3. The guide route 50b includes a plurality of expressway sections 57c and 57d. The expressway section 57c is located before the expressway section 57d in the traveling direction of the guide route 50b. The expressway section 57c is a section from the designated entrance interchange 62 to the exit interchange 68h, and includes an exit interchange 68g on the way. The expressway section 57d is a section from an entrance interchange 64h to the designated exit interchange 66. Moreover, the guide route 50b includes general road sections 85d to 85f. Then, the expressway section 57c connects the general road sections 85d and 85e to each other, and the expressway section 57d connects the general road sections 85e and 85f to each other.

In a case where the vehicle has deviated from the guide route 50b by coming out of the expressway section 57c from the exit interchange 68g along an arrow Y4 with respect to the guide route 50b shown in FIG. 16, the re-routing unit 14 detects the third condition. Supposing that the designation of the exit interchange 66 is cancelled only by the detection of the third condition, then there is an apprehension that, in a route to be re-searched by re-routing after this cancellation, an exit interchange different from the exit interchange 66 desired by the user may be set as an exit. Accordingly, in the case where it is determined that the designated exit interchange is present as a result of the determination in Step S360 (FIG. 21), then in Step S370, the re-routing unit 14 determines whether or not this designated exit interchange and the occurrence point of the re-routing are present in the same expressway section. Then, in a case where it is determined that both are present in the same expressway section, the re-routing unit 14 cancels the designation of the designated exit interchange in Step S420. Note that, in the example shown in FIG. 16, both are not present in the same expressway section, and accordingly, the processing is returned to Step S140 (FIG. 17) as a result of the determination in Step S370.

Note that, in the example shown in FIG. 16, the plurality of expressway sections are included in the guide route; however, the utility of the present invention is not damaged even if the determination processing of Step S370 is performed in a case where only one expressway section is included. By the determination processing of Step S370, the possibility that the designation of the designated exit interchange may be cancelled against the intention of the user can be further reduced, and the utility of the user can be further enhanced.

Note that, in a case where only one expressway section is included in the searched route as in the route 50 in FIG. 11, even if the designation of the designated exit interchange is cancelled without performing the determination processing of Step S370, this cancellation does not become the cancellation performed against the intention of the user. Hence, the utility of the present invention is not damaged even if the determination processing of Step S370 is not performed.

A-2-4. Operations in Case where Re-Routing Occurs on Expressway

In a case where it is determined that the road type is not changed from the expressway to the general road in the event where the re-routing occurs as a result of the determination in Step S350 (FIG. 21), the re-routing unit 14 determines whether or not, in the event where the re-routing occurs, both of road types of the road on which the current position of the vehicle is present before and after the occurrence are the expressway based on the information about the road type of the road detected by the route guide unit 16 (Step S380). If both of the road types before and after the occurrence of the re-routing are the expressway as a result of the determination, then it is found out that the re-routing occurs on the expressway. For example, in a case where it is determined that at least one of the road types before and after the occurrence of the re-routing is not the expressway as a result of this determination, the processing is returned, for example to Step S1150 (FIG. 17), and the processing on and after this step is performed.

In a case where it is determined that both of the road types before and after the occurrence of the re-routing are the expressway as a result of the determination in Step S380, the notification unit 15 performs notification of the cancellation of the designation of the designated exit interchange by displaying a telop on the screen 29a and the like (Step S410). Thereafter, the re-routing unit 14 cancels the designation of the designated exit interchange (Step S420), performs the re-routing one more time after this cancellation of the designation is completed, and re-searches a new guide route (Step S300 in FIG. 19). When this re-routing is completed, the processing is returned to Step S140 (FIG. 17), and the route guide unit 16 starts the route guidance using the guide route re-searched in Step S300, and in addition, performs the processing on and after Step S140.

For example, in a case where the vehicle, which has traveled in accordance with the guide route 50 shown in FIG. 2, travels in the direction of the arrow Y10 without coming out of the expressway 56 from the designated exit interchange 66, the designation of the exit interchange 66 is cancelled. Then, by the re-routing in Step S300, for example, a new guide route, which comes out of the expressway 56 from the exit interchange 68b located forward of the exit interchange 66 in the traveling direction of the guide route 50 and reaches the destination G1, is re-searched and guided.

Incidentally, in usual, the expressway is connected by a junction to an expressway on another line, and forms an expressway network. Then, there is a case where the vehicle, which has traveled in accordance with the guide route, mistakes selection of a course at the junction, and deviates from the guide route. Then, even in the case where the deviation from guide route occurs at the junction, there is a case where the vehicle can join the initial guide route from another junction and come out of the expressway from the designated exit interchange without entering the general road from the expressway. On the contrary, there is also a case where the vehicle cannot join the initial guide route or come out of the initially designated exit interchange if the vehicle does not enter the expressway one more time after entering the general road once from an exit interchange that is not designated.

By performing predetermined additional processing between Step S400 and Step S410, the re-routing unit 14 can reduce the cancellation of the designation, which is performed for the designated exit interchange against the intention of the user, also for the deviation of the guide route from the junction. In this additional processing, for example, the re-routing unit 14 first determines whether or not the vehicle is capable of reaching the designated exit interchange without entering the general road on a route re-searched by the re-routing of Step S200 (FIG. 18) in response to the deviation from the guide route on the expressway. Then, in a case where the vehicle is capable of reaching the designated exit interchange that way, the re-routing unit 14 does not perform the cancellation of the designation of the designated exit interchange, and performs this cancellation of the designation in a case where the vehicle is incapable of reaching the designated exit interchange.

In accordance with the navigation device according to this embodiment, which is configured as described above, by the detection of the predetermined condition including at least one of the first condition, the second condition and the third condition, the designation of the interchange is cancelled, and the re-search for the route is performed. These conditions individually correspond to situations where the cancellation of the designation of the designated interchange is more desirable for the user. Hence, in the cancellation of the designation of the interchange on the guide route, the convenience for the user can be enhanced.

Moreover, in accordance with the navigation device according to this embodiment, among the cases where the first condition is detected, only in the case where the point where the first condition is detected is within the predetermined distance range from the entrance interchange, the designation of the entrance interchange is cancelled. Then, the re-search for the guide route is performed. Hence, for example, in such a case where the designated entrance interchange is located remotely, the possibility that the designation of the interchange may be cancelled against the intention of the user can be reduced.

Furthermore, in accordance with the navigation device according to this embodiment, among the cases where the first condition is detected, only in the case where the user's operation of permitting the cancellation of the designation of the designated interchange is received, the designation of the interchange is cancelled. Then, the re-search for the route is performed. Hence, even in a case where the predetermined number of times related to the detection of the first condition is set small, the possibility that the designation of the interchange may be cancelled against the intention of the user is reduced.

Moreover, in accordance with the navigation device according to this embodiment, for each of the guide route and the re-routed route, the number of sections distinguishable by the change of the road type on the route is obtained, and it is detected that the number of sections on the guide route and the number of sections on the re-routed route are different from each other, whereby the third section can be detected. Hence, for example, even in a case where it is difficult to detect the third condition based on the change of the road type at the time when the re-routing occurs, the navigation device can detect the third condition more accurately by using the technique for detecting the difference in the number of sections.

Furthermore, in accordance with the navigation device according to this embodiment, among the cases where the third condition is detected in the case where one or a plurality of the expressway sections are included in the guide route, only in the case where the point where the third condition is detected and the designated exist interchange are present in the same expressway section, the designation of the exit interchange is cancelled. Then, the re-routing of the guide route is performed. Hence, in the case where the plurality of expressway sections are included in the guide route, the possibility that the designation of the exit interchange may be cancelled against the intention of the user is reduced.

Moreover, in accordance with the navigation device according to this embodiment, the interchange to serve as a target of the cancellation of the designation is switched, for example, according to a way of the change of the road type, such as the change from the general road to the expressway in the event where the deviation from the guide route is detected. By this switching, the cancellation of the designation of the designated interchange can be flexibly performed without being against the intention of the user, and accordingly, the convenience for the user can be enhanced.

Incidentally, in the operation flow S100 shown in FIG. 17 to FIG. 21, in Step S200 next to Step S190 (FIG. 18) where the deviation of the vehicle from the guide route is detected, the re-search for the guide route is performed. However, after passing through the various types of determination processing as to whether or not it is necessary to cancel the designation of the designated interchange and through the processing for the results of the determinations, the re-routing may be performed in the steps immediately before the processing is returned to Step S140 (FIG. 17) where the guidance of the route is started. In this case, for example, at the time of detecting that the mobile body deviates from the guide route on the general road the predetermined number of times and the like, the re-routing unit 14 cancels the designation of the designated entrance interchange, and performs the re-search for the route.

Note that, in the present invention, it is possible to appropriately deform and omit the embodiment within the scope thereof.

EXPLANATION OF REFERENCE NUMERALS

14 RE-ROUTING UNIT, 16 ROUTE GUIDE UNIT, 27 RECEPTION UNIT, 50 GUIDE ROUTE, 100 NAVIGATION DEVICE

The invention claimed is:

1. A navigation device that performs route guidance for a mobile body, comprising:
   a processor to execute a program; and
   a memory to store the program which, when executed by the processor, results in performance of steps comprising,
   guiding a route including a section of an expressway in which a user designated interchange is an entrance or exit;
   detecting deviation of said mobile body from said guided route;
   determining a road type of a road on which the said mobile body is located before and after the detected deviation; and
   re-routing said route in a case where a deviation of said mobile body from said route is detected,
   wherein in a case where road types of roads on which said mobile body is located before and after the detected deviation are determined to both be expressways, said re-routing includes canceling the user designation of a designated exit interchange before performing re-routing of said route.

2. The navigation device according to claim 1,
   wherein upon determining that road types of roads on which said mobile body is located before and after a deviation from said route is detected are both expressways,
   in a case where said mobile body is capable of reaching a user designated exit interchange without entering a general road, said re-routing does not perform canceling the designation of said exit interchange and performs re-routing of said route, and
   in a case where said mobile body is incapable of reaching a user designated exit interchange without entering a general road, said re-routing performs cancelling the designation of said exit interchange and performs re-routing of said route.

3. The navigation device according to claim 1, wherein said steps further comprise
notifying the user of the cancellation of the user designation of said exit interchange.

4. A method for navigating, the method being for performing route guidance for a mobile body by a navigation device, the method comprising:
guiding, by said navigation device, a route including a section of an expressway in which a user designated interchange is an entrance or exit;
detecting, by the navigation device, a deviation of said mobile body from said guided route;
determining, by said navigation device, a road type of a road on which the said mobile body is located before and after the detected deviation; and
performing re-routing of said route, by said navigation device, in a case where a deviation of said mobile body from said route is detected,
wherein said re-routing includes, upon determining that the road types of the roads on which said mobile body is located before and after the detected deviation are both expressways, cancelling the designation of a user designated exit interchange and then performing re-routing of said route.

5. The method for navigating according to claim 4,
wherein said re-routing includes a step of, upon determining that the road types of the roads on which said mobile body is located before and after the detected deviation are both expressways,
in a case where said mobile body is capable of reaching a user designated exit interchange without entering a general road, cancelling no designation of said exit interchange and performing re-routing of said route, and
in a case where said mobile body is incapable of reaching a user designated exit interchange without entering a general road, cancelling the designation of said exit interchange and performing re-routing of said route.

6. The method for navigating according to claim 4, further comprising
notifying the user of the cancellation of the designation of said exit interchange by said navigation device.

* * * * *